April 17, 1945.  W. A. DE VELLIER  2,373,878
HEADER DIE FOR USE IN MAKING SCREW BLANKS
FOR DOUBLE THREADED SCREWS
Filed March 22, 1943  3 Sheets-Sheet 1
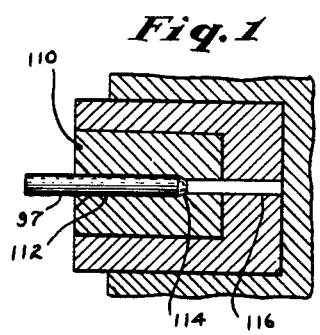
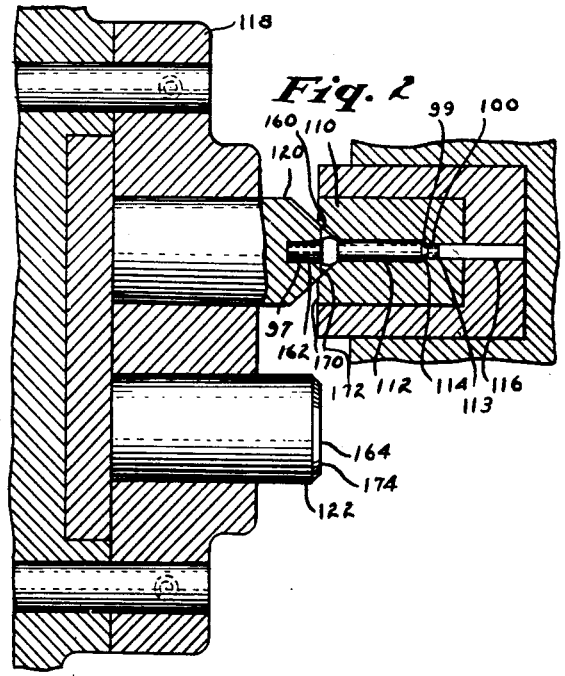
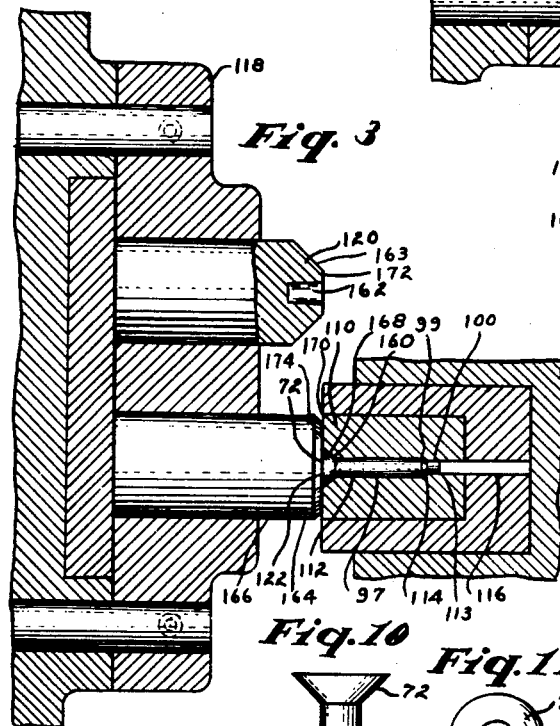
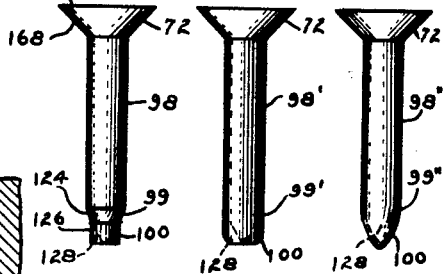
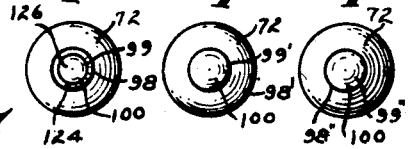
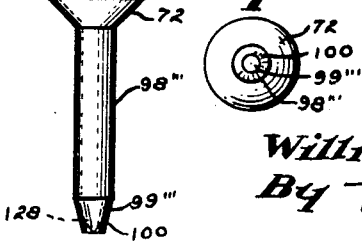
Inventor
William A. DeVellier
By Thomas A. Jenckes
Attorney April 17, 1945. W. A. DE VELLIER 2,373,878
HEADER DIE FOR USE IN MAKING SCREW BLANKS
FOR DOUBLE THREADED SCREWS
Filed March 22, 1943 3 Sheets-Sheet 2

Inventor
William A. DeVellier
By Thomas A. Jenckes
Attorney

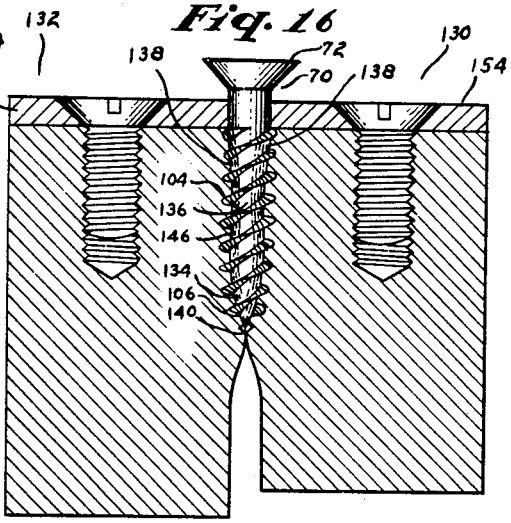

Patented Apr. 17, 1945

2,373,878

UNITED STATES PATENT OFFICE 2,373,878

HEADER DIE FOR USE IN MAKING SCREW BLANKS FOR DOUBLE THREADED SCREWS

William A. De Vellier, New York, N. Y., assignor to New Process Screw Corporation, Waterville, Conn., a corporation of Delaware Application March 22, 1943, Serial No. 480,019

4 Claims. (Cl. 10—7)

My invention relates to improvements in rolled double threaded screws, screw blanks suitable for rolling double threads thereon and method and apparatus for their manufacture, and is particularly adapted for double threaded screws. This application is a continuation in part of my application on Screw and its method of manufacture, Ser. No. 405,678, filed August 6, 1941, issued as Patent 2,314,391, March 23, 1943.

An object of my invention is to provide continuous double threads extending the desired distance along the shank and along the pointed portion of the shank, each thread tapering outwardly to a sharp continuous spiral cutting edge, sharper than any edge which can be provided on a cut screw and simulative of a razor edge.

Great difficulty has hitherto been experienced in rolling threads down to the tip of the pointed portion of the screw shank. In the prior art, most shanks have been pointed in a pointing machine which gives a straight conical pointed portion, specifically removing the metal for this purpose with the thought of providing a shank having a conical pointed portion. Due to the fact that so much metal has been removed, I have found that there is not sufficient metal left from which threads extending to the tip of the pointed portion of the shank may be formed. I have discovered, however, that if a length of stock be pressure shaped to form the head of a screw blank on one end and a reduced irregular shaped pointed portion having an excess of metal thereon over that required for a conical pointed portion on the opposite end thereof and the screw blanks subjected to any suitable type of rolling operation, continuous double threads may be formed on the pointed portion of the shank from said excess metal displaced from said pointed end portion to form continuous double threads extending at least to the tip of said pointed portion. While it has been difficult to roll single threads on a screw extending to the tip of the pointed portion of the shank, it has been extremely difficult when rolling double threads to roll them to the tip of the pointed portion of the shank as more metal is required to provide the material for two threads than for one. I believe I am the first, therefore, to successfully roll a double threaded screw having double threads extending at least to the tip of the pointed portion of the shank. In certain respects this application is an improvement over my former application for patent for Screws and method and apparatus for making same, S. N. 290,621, filed August 17, 1939, issued as Patent 2,314,390, March 23, 1943. In the embodiments shown in this application, however, I axially force the metal to form the point on the ends of the threads down from the mass of excess metal formed on the pointed portion of the shank, whereas in the method shown in said application, the metal is never axially extruded but always radially extruded.

A further object of my invention, therefore, is to provide a predetermined amount of excess metal on the pointed portion of the shank and so roll the threads as to shape the ends of each of said threads into sharp incising means projecting substantially axially downwardly of the pointed portion of said shank, the excess metal being axially displaced and molded downwards to form continuous double threads on the pointed portion of the shank, each thread terminating in sharp incising means of a desired predetermined shape projecting substantially axially downwardly of said pointed portion of the shank, the amount of excess metal originally provided on said pointed portion depending on the predetermined shape desired in the sharp substantially axially downwardly projecting incising means formed by the end of each respective thread.

A further object of my invention is to produce a screw blank capable of having threads rolled thereon to produce the various types of screws set forth and claimed in said parent application.

In the prior art it has hitherto been thought necessary after a screw blank has been suitably headed in the header to point it to provide a conically pointed shank portion by removing metal, which feature could not be conveniently done in the header to provide the sharp conically pointed shank portion formerly thought desirable. Inasmuch as for the purposes of employing my improved method a shank pointed portion having a sharp tip is not necessary, I have discovered that blunt pointed shank portions of a desired predetermined shape having the required excess of metal thereon to provide the threads extending to the tip of the pointed portion of the shank may be simultaneously formed in the header in a single operation as the head itself is being formed on the screw blank, and I am, therefore, able by a single heading operation to provide both the head and a suitably pointed shank portion so that after a single punching operation a screw blank may be provided immediately ready for rolling into my improved screw.

A further object of my invention is to provide blanks shaped as aforesaid in the heading apparatus by the heading dies so that double threads may be readily rolled on the shank and point thereof.

These and such other objects of my invention as may hereinafter appear will be best understood from a description of the embodiments thereof shown in the accompanying drawings.

Fig. 1 is a sectional view through a female heading die of a suitable header containing a length of cylindrical stock to be made into the finished screw.

Fig. 2 is a sectional view through the female die shown in Fig. 1 and the multiple punch holder of a suitable header showing the coning punch in the simultaneous function of initiating the shape of the head and forming the opposite end of the piece of stock into a shank end having an irregularly shaped pointed portion having an excess of metal thereon greater than required for a conically pointed portion in accordance with my invention, thus pointing the shank to provide the desired irregular shape with the initial coning punch stroke of the header.

Fig. 3 is a sectional view identical with Fig. 2, showing the finishing punch stroke in the act of completing the formation of the head on the screw blank shank to form a flat headed screw blank.

Fig. 4 is a side elevation and Fig. 5 is a reverse plan view of one embodiment of screw blank after it has been formed in the header with an excess of metal on the pointed portion of the shank greater than is required for a conically pointed portion.

Fig. 6 is a side elevation and Fig. 7 is a reverse plan view of another embodiment of screw blank constructed in accordance with my invention having a domed tip of relatively large radius and being particularly suited to roll a cutting blade.

Fig. 8 is a side elevation and Fig. 9 is a reverse plan view of a still further embodiment of screw blank constructed in accordance with my invention, employing a conically pointed portion with slightly domed walls to provide the excess metal for the threads.

Fig. 10 is a side elevation and Fig. 11 is a reverse plan view of a still further embodiment of screw blank constructed in accordance with my invention, having a frusto-conical pointed portion.

Fig. 16 is a sectional view of the stationary and movable dies in the act of rolling double threads on the screw blanks shown in Figs. 4–11.

Fig. 17 is a plan view of the die and Fig. 18 is a plan view of the coning punch employed on the first coning stroke of the header to produce a flat headed screw of the type as shown in Figs. 21 and 22 in the heading apparatus as indicated in Fig. 2.

Fig. 19 is a plan view of the same die and Fig. 20 is a plan view of the finishing punch employed on the second finishing stroke of the header to produce a flat headed screw of the type shown in Figs. 21 and 22 in the heading apparatus as indicated in Fig. 3.

Fig. 21 is a side elevation and Fig. 22 is a plan view of a screw constructed in accordance with my invention having a flat head produced in the manner indicated in Figs. 1–3.

Fig. 23 is a side elevation and Fig. 24 is a plan view of a screw constructed in accordance with my invention having an oval head produced in the manner indicated in Figs. 14 and 15.

Fig. 25 is a side elevation and Fig. 26 is a plan view of a screw constructed in accordance with my invention having a round head produced in the manner indicated in Figs. 12 and 13.

Fig. 27 is a side elevation and Fig. 28 is a plan view of a screw constructed in accordance with my invention having a binding head.

In the drawings, wherein like characters of reference generally indicate like parts throughout, 70 generally indicates a screw constructed in accordance with my invention.

Figure 12:
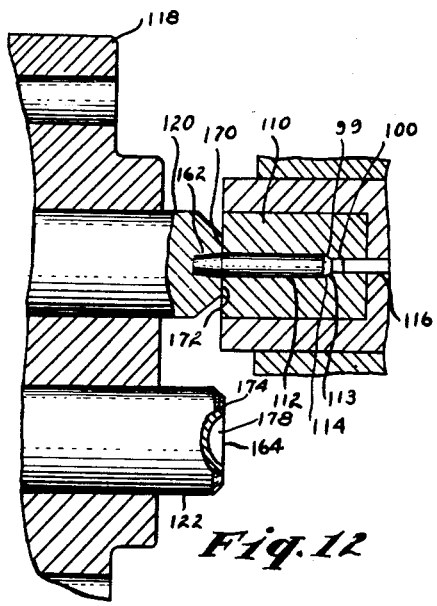
Fig. 12 is a sectional view similar to Fig. 2 showing the first step in the method of making a screw having a round head and the typical point of my invention, being similar to the first coning stroke of the heading apparatus shown in Fig. 2 for making a screw having a flat head.

As stated hitherto, it has been customary in the prior art to form pointed portions 128 of conical shape on the screw blanks 98 prior to rolling threads thereon. Great difficulty has been experienced in finding enough metal from such a conically pointed portion of the shank to form threads extending to or beyond the tip 76 of said conically pointed portion 75. This is particularly true where it is desired to roll double threads as they require considerable metal.

My invention is adapted for use in rolling double threaded screws. My improved screw has the usual head 72, the shank 74 and the tapered pointed portion 75 of the shank terminating in the tip 76 and the continuous double threads 78 extending spirally downwardly through at least a portion of said shank 74 and said tapered pointed portion 75. Each thread 78 tapers outwardly to a sharp continuous spiral cutting razor-like edge 79 of substantially even height throughout the shank 74 and of progressively decreasing height in said tapered portion of the shank 75. If desired, the threads may taper downwardly at the upper ends thereof to the shank as at 80, thus being of progressively increasing height at the upper ends thereof, it being obvious that with this structure the shank 74 itself is slightly tapered in reverse direction as at 81 at his portion as less metal is extruded therefrom to form said threads. Employing my invention, the lower ends of said double threads form sharp incising means 82 projecting substantially axially downwardly of the pointed portion 75 of said shank in all embodiments of my invention.

My invention also includes a novel method of rolling double threaded screws, which comprises pressure shaping or otherwise forming a length of stock 97 into a blank 98 having a head 72 on one end thereof and an irregular shaped pointed portion 99 having an excess of metal 100 thereon greater than required for a conically pointed portion 128, as shown in dotted lines in Figs. 4, 6, 8 and 10, on the opposite end thereof, and rolling continuous double threads 78 on the other end of the shank 74 adjacent to and on said pointed portion 99 and displacing said excess metal 100 on said pointed portion 99 to form it into the pointed portion 75 of the finished screw and to form continued threads 94 on said pointed portion 75, each terminating in sharp incising means 82 projecting substantially axially downwardly of said pointed portion 75. I have found that while the formation of a true conically pointed portion 128 has been difficult in the header, my improved pointed portion 99 is of such irregular shape that it may be readily formed in the header, preferably in the initial blow for roughening the head.

The threads 78 may be rolled on the screw blanks 98 in any suitable manner, such as in the manner shown in application Ser. No. 290,621, aforesaid, by true radial extrusion. Commercial results, however, may be obtained by rolling them in a standard type of dies for rolling machine screw threads, such as shown in the accompanying drawings, modified to roll double threads by providing groove means 104 in said dies having an included angle of 45°-55° preferably of substantially 45° and a pitch angle of 8°-22°. With this type of rolling dies the excess metal 100 is forced axially downwardly as well as radially outwardly over the sides of the pointed portion 99 of the shank and even beyond the tip 76 of said simultaneously formed pointed portion 75, if desired, to form the threads 94 of decreasing height terminating in the sharp incising means 82, whether merged to form a single point or a single blade, or left spaced to provide spaced means comprising spaced points or spaced blades. It is thus obvious that the amount of excess metal 100 provided may be varied, as well as the method and amount of rolling varied to produce these different results. Thus, where a quantity of metal is required, as in a blade, more excess metal may be provided in the pointed portion 99 of the blank 98, as in the embodiment shown in Figs. 6 and 7, having a dome shaped pointed portion 99' of large radius. When the desired type of screw has been decided upon, the amount of excess metal 100 provided at the pointed portion 99 of the blank 98 and the nature and the amount of rolling may be predetermined so as to continuously reproduce the same type of screw, the amount of excess metal 100 depending, therefore, upon the desired shape of the incising means 82 desired in the finished screw, the incising means 82 of the desired predetermined shape being produced by variations in the amount of excess metal 100 and the type of and the amount of rolling employed. While I preferably roll said threads 94 down to an incising point or blade, a novel desirable type of screw may be produced if the threads are not rolled down to a single point or a single blade, but left terminating in spaced incising means, on each side of the pointed portion 75 of the screw, in which the screw may initially bite into the wood or other material at two points or portions, tending initially to more evenly align it and provide a self-centering screw, said modified forms being shown in said parent application.

I have shown in the drawings suitable apparatus for carrying out my improved method. I have shown in Figs. 1-3 diagrammatic portions of a heading machine. For this purpose the female heading die 110 may be provided with the usual bore 112 for receiving the stock 97. Said bore 112 is provided with the inwardly tapering portion 114 near the inner end thereof and a short portion 116 of smaller bore or diameter beyond said tapered portion 114. The header may be provided with the usual multiple punch holder 118 having the usual coning punch 120 for initiating the shape of the head 72 and the finishing punch 122. I have shown in Fig. 2 the stock 97 being formed with the excess of metal 100 on the pointed portion 99 greater than required for the conically pointed portion 75 of the screw shank made by jamming the piece of stock 97 inwardly within said bore 112 through said tapered portion 114 so that the end 99 thereof terminates within the portion 116 of smaller diameter to provide the screw blank 98 shown in Figs. 4 and 5 having a pointed portion 99 comprising a tapered portion 124 and a portion of smaller diameter 126 below said tapered portion, said tapered portion 124 and portion 126 of smaller diameter forming the pointed end portion 99 of the screw blank 98, providing the excess of metal 100 greater than required for a conically pointed portion 128. Thus the screw blanks 98 are shaped for rolling with the desired excess metal 100 thereon in the roughening or coning stroke of the header, it being obvious that the completion of the head into the desired shape 72 is accomplished by the second finishing punch stroke of the finishing punch 122, as shown in Fig. 3. I have shown in Figs. 4-11 various species of screw blanks having the pointed ends 99 having the excess of metal 100 thereon, the embodiment 99 shown in Figs. 4 and 5 having the tapered portion 124 and the cylindrical portion 126 of smaller diameter as hitherto described in excess of the conically pointed portion 128. I have shown in Fig. 6 a screw blank 98' having the excess metal 100 thereon and having a dome shaped end 99' with a dome of relatively large radius to provide considerable excess metal 100 for rolling a screw having one or more blades or points in the manner to be described. I have shown in Figs. 8 and 9 a screw blank 98'' having a conical point 99'' with the excess metal 100 being provided by doming the side walls of the conical point 128. I have shown in Figs. 10 and 11 a suitable blank 98''' formed with a frusto-conical point 99''' to provide another manner of providing the excess metal 100 in excess of a conical point 128. For cheapness and economy of manufacture, however, due to the peculiar rough shaping required in the pointed portion of the screw blanks, these may be readily roughed out simultaneously with the initial heading step by the application of the same force, the initial punching blow of a standard heading machine.

As stated hitherto, my invention includes the proper combination of dies in a standard type of heading apparatus to produce a screw blank suitable for rolling double threads having a point forming portion having an excess of metal thereon greater than required for a conical point and simultaneously with the formation of said point in the heading machine having contacting faces of the punch and die shaped to shape a head 72 of the desired shape on said screw blank.

I have shown in Figs. 21-28 typical types of heads which may be produced on screws constructed in accordance with my invention. Figs. 21-22 showing a screw having a flat head, Figs. 23-24 showing a screw having an oval head, Figs. 25-26 showing a screw having a round head and Figs. 27–28 showing a screw having a binding head.

The point forming portion 99 of the screw blank may be shaped in any suitable manner. For this purpose, as previously described, the inner end of the bore 112 in the heading die 110 may be provided with a point forming portion 113 in the inner end thereof shaped to provide an excess of metal on said point greater than required for a conical point, in the specific embodiment shown to produce the screw blank shown in Figs. 4 and 5, with an inwardly tapered portion 114 in the inner end thereof and hence the outer end of the screw blank shank and a shorter portion of smaller bore 116 beyond said inwardly tapered portion 114. If, however, it be desired to produce the screw blanks shown in Figs. 6–11 or other shapes, it is obvious that the inner point forming portion 113 of said bore 112 may be correspondingly shaped to produce said respective shapes on the coning stroke of the header.

It is obvious that typical types of screw heads may be made by suitably varying the contacting surfaces of the die and the finishing punch in the standard manner known in the art. Thus, if it be desired to make a flat headed screw, I shape the punch and dies in the manner indicated in Figs. 17–20 and as shown in Figs. 2 and 3. For this purpose the surface 170 of the heading die 110 around the bore 112 is provided with an outwardly flaring screw blank head forming conical recess 160. The coning punch 120 is provided with a centering cavity 162 therein, in the embodiment shown, comprising a short frusto-conical bore, the purpose of the centering cavity 162 being to center the mass of metal on the end of the piece of stock 97 no matter in what irregular manner it may be cut so that it may be evenly distributed about its center or axis for the finishing stroke of the header. Thus when the coning punch 120 and die 110 are relatively brought together on the first stroke of the header the coning punch 120 pushes metal from the outer end of the piece of stock 97 into said coning recess 160 and within said centering cavity 162 to initiate the formation of the screw blank head 72 and simultaneously pushes the piece of stock inwardly through said shaped point forming portion 113 to provide a blank having a shank terminating in a reduced point having an excess of metal thereon greater than required for a conical point.

The finishing punch 122, movable by the header into alignment with said die 110 for the finishing stroke of the header, is provided with an end 164 shaped to form the head, in the embodiment shown in Figs. 1–3 with the flat end surface 174, whereby when the finishing punch 122 and die 110 are relatively brought together on the finishing stroke of the header, the metal at the outer end of the piece of stock 97 is flattened into the die recess 160 to form the screw blank head 72 to provide a screw blank suitable for rolling double threads thereon having a head 72 having a flat outer wall 166 and a conical wall 168 extending to the screw blank shank 98 and a point 99 having an excess of metal thereon greater than required for a conical point.

Figure 14:
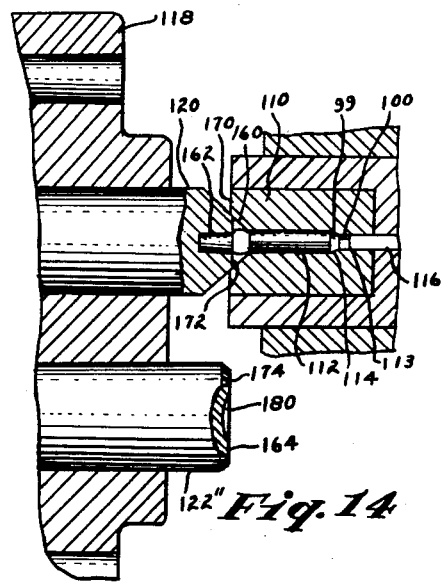
Fig. 14 is a sectional view similar to Fig. 2 showing the first step in the method of making a screw having an oval head and typical point, being substantially identical to the first coning stroke shown in Fig. 2 for making a screw having a flat head.
Figure 13:
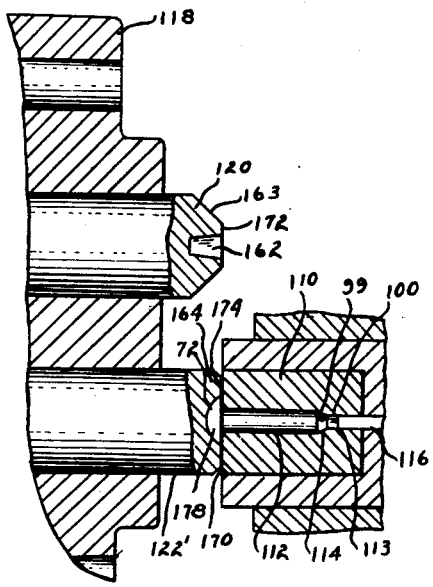
Fig. 13 is a sectional view identical to Fig. 12 and similar to Fig. 3 showing the finishing punch stroke in the act of completing the formation of the round head in the screw blank shank with contacting faces of the finishing punch and die modified from the shape shown in Fig. 3 for this purpose.
Figure 15:
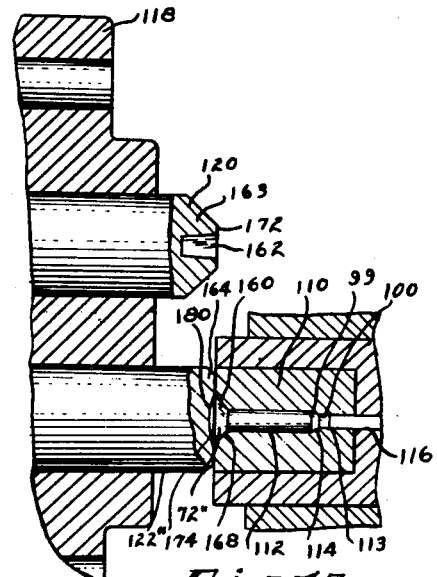
Fig. 15 is a sectional view identical to Fig. 14 and similar to Fig. 3 showing the finishing punch stroke in the act of completing the formation of the oval head in the screw blank shank with contacting faces of the finishing punch and die modified from the shape shown in Fig. 3 for this purpose.

As stated hitherto, various standard types of heads may be made in the manner known in the art by varying the shape of the contacting surfaces 170, 172 and 174 of the die 110, the coning punch 120 and the finishing punch 122 respectively. Thus to produce the round headed screw shown in Figs. 25 and 26, the surface 170 of the die is left flat and the shape of the centering cavity 162 in the end 163 of the coning punch is correspondingly enlarged to have all of the excess of metal exterior of the face of the die and within the end of the coning punch after the coning stroke of the header as shown in Fig. 12. The surface 174 of the end 164 of the finishing punch is provided with a central concavity 178 to provide the round head 72' as shown in the embodiment shown in Figs. 25 and 26 on the finishing stroke of the header as shown in Fig. 13. To make the oval head 72" as shown in the embodiments shown in Figs. 23 and 24, modifications of the respective cavities 160 and 162 in the die and coning punch respectively are provided, the die being provided with the cavity 160 similar to that employed in making a flat headed screw and the coning punch being provided with a centering cavity 162 similar to that employed in making a flat head 72, as shown in Fig. 14 and previously shown in Figs. 2 and 3. In this instance, however, the finishing punch 122" is provided with a contacting surface 174 having a central cavity 180 to provide the oval surface on the oval head 72" as shown in Fig. 15 similar to the modified cavity 178 on the end of the finishing punch 122' for making a round head but of a larger curvature. In making a screw with an oval head it is therefore obvious that cooperating cavities 160 and 180 on both the die 110 and finishing punch 122" are provided. The binding screw head 72''' is made in similar fashion as the round screw head 72', the cavity in the finishing punch being suitably modified from the cavity 178 in the finishing punch to form a cylindrical head 72''' rather than a round head 72'.

I have shown in Fig. 16 suitable types of dies generally similar to the standard dies for rolling single threads on machine or other screws, modified to roll the double threads 78 extending at least to the extreme tip 76 of the pointed portion 75 of the shank 74 in accordance with my invention. These dies comprise the usual stationary die 130 and the die 132 movable relatively thereto in a standard type of screw rolling machine, a suitable type being shown in Arenz Patent #1,912,879. Each die 130 and 132 has a face 134 comprising a continuous cavity 136 having a cooperating inwardly tapered portion 138 adjacent the upper end thereof and a pointed portion forming portion 140 tapering arcuately outwardly to the surface of said die beyond said cavity 136. Each face 134 is provided with continuous thread forming groove means 104, each terminating in a sharp intaglio ridge 106, extending obliquely inwardly thereof at spaced distances throughout the height of said face throughout said tapered portion 138, the shank forming portion 146 and said pointed portion forming portion 140. Each groove means 104 is of progressively increasing depth in said tapered portion 138, of substantially even depth in said shank forming portion 146 and of progressively decreasing depth in said pointed portion forming portion 140.

In order to provide the double threads 78, the groove means 104 has an included angle of 45°–55° preferably of substantially 45° and a pitch angle of substantially 8°–22°. The tapered portion 138 in each respective die may be provided in the manner shown and described in my application Ser. No. 290,621, aforesaid, the tapered portion 138 in this instance, however, being for a different purpose than shown in said application and of a much less degree, in the present instance being for the purpose of providing threads of progressively increasing height near the upper end thereof.

It is obvious that any of these novel types of screws may be made by my improved method, the shape and nature of the incising means projecting axially from the lower end of the pointed portion 75 of the screw depending on the amount of excess metal 100 provided in the pointed portion 99 of the screw blank 98 and the method of and amount of rolling, it being obvious that once these factors have been determined, identical screws may be continuously produced by my method having identical predetermined incising means. It is apparent that I have provided a novel method of manufacturing rolled screws including specifically a novel method of making screw blanks for use in the manufacture of double threaded rolled screws and a novel combination of dies for this purpose as well as novel types of screw blanks with the advantages described above.

It is understood that my invention is not limited to the specific embodiments shown or methods described and that various deviations may be made therefrom without departing from the spirit and scope of the appended claims.

What I claim is:

1. In a header, in combination, a single heading die having a bore for receiving a length of stock to form a screw blank, said bore having an outwardly flaring conical recess at the outer end thereof and a reduced point forming portion at the inner end thereof shaped to provide an excess of metal on said point greater than required for a conical point, a coning punch cooperating therewith having a centering cavity therein whereby when the coning punch and single die are relatively brought together on the first stroke of the header the coning punch pushes metal from the outer end of the piece of stock into the centering cavity to initiate the formation of the screw blank head, and simultaneously pushes the piece of stock inwardly within said shaped point forming portion to provide a screw blank having a shank terminating in a reduced point having an excess of metal greater than required for a conical point and a finishing punch alternately movable into alignment with said single die having a head forming end whereby when the finishing punch and single die are relatively brought together on the finishing stroke of the header, the metal at the outer end of the stock is forced into the die recess and shaped to form the screw blank head whereby said single die and two punches alone may provide a finished screw blank suitable for rolling double threads thereon having a head having an outer surface and a conical inner wall extending to the screw blank shank and a reduced point having an excess of metal thereon greater than required for a conical point.

2. In a header, in combination, a heading die having a bore for receiving a length of stock to form a screw blank, said bore having an outwardly flaring conical recess at the outer end thereof and a reduced point forming portion at the inner end thereof shaped to provide an excess of metal on said point greater than required for a conical point, and a coning punch cooperating therewith having a centering cavity therein whereby when the coning punch and die are relatively brought together on the first stroke of the header the coning punch pushes metal from the outer end of the piece of stock into the centering cavity to initiate the formation of the screw blank head and simultaneously pushes the piece of stock inwardly within said shaped point forming portion to provide a screw blank having a shank terminating in a reduced point having an excess of metal greater than required for a conical point.

3. In a header, in combination, a single heading die having a bore for receiving a length of stock to form a screw blank, said bore having a reduced point forming portion at the inner end thereof shaped to provide an excess of metal on said point greater than required for a conical point, a coning punch cooperating therewith having a centering cavity therein whereby when the coning punch and die are relatively brought together on the first stroke of the header the coning punch pushes metal from the outer end of the piece of stock into the centering cavity to initiate the formation of the screw blank head and simultaneously pushes the piece of stock inwardly within said shaped point forming portion to provide a screw blank having a shank terminating in a reduced point having an excess of metal greater than required for a conical point, and a finishing punch alternately movable into alignment with said single die having an end shaped to form the head whereby when the finishing punch and single die are relatively brought together on the finishing stroke of the header, the metal at the outer end of the stock is shaped to form the screw blank head whereby said single die and two punches alone may provide a screw blank suitable for rolling double threads thereon having a head and a reduced point having an excess of metal thereon greater than required for a conical point.

4. In a header, in combination, a heading die having a bore for receiving a length of stock to form a screw blank, said bore having a reduced point forming portion at the inner end thereof shaped to provide an excess of metal on said point greater than required for a conical point, and a coning punch cooperating therewith having a centering cavity therein whereby when the coning punch and die are relatively brought together on the first stroke of the header the coning punch pushes metal from the outer end of the piece of stock into the centering cavity to initiate the formation of the screw blank head and simultaneously pushes the piece of stock inwardly within said shaped point forming portion to provide a screw blank having a shank terminating in a point having an excess of metal greater than required for a conical point.

WILLIAM A. DE VELLIER.